(12) United States Patent
Dale et al.

(10) Patent No.: US 7,694,210 B2
(45) Date of Patent: Apr. 6, 2010

(54) TURBO-CODING DOCSIS INFORMATION FOR SATELLITE COMMUNICATION

(75) Inventors: Mark Dale, Laguna Hills, CA (US); Dorothy Lin, Laguna Beach, CA (US); Jen-chieh Chien, Lake Forest, CA (US); Alan Gin, Corona Del Mar, CA (US); Rocco J Brescia, Jr., Newport Coast, CA (US); Alan Kwentus, San Juan Capistrano, CA (US); David L Hartman, Laguna Hills, CA (US); Joyce Wang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2380 days.

(21) Appl. No.: 10/208,045

(22) Filed: Jul. 31, 2002

(65) Prior Publication Data

US 2004/0022307 A1 Feb. 5, 2004

(51) Int. Cl.
*H03M 13/03* (2006.01)
(52) U.S. Cl. .................................................... 714/786
(58) Field of Classification Search ................ 714/746, 714/755, 784, 786; 370/342, 465, 466
See application file for complete search history.

(56) References Cited

U.S. PATENT DOCUMENTS

| 5,406,570 | A | 4/1995 | Berrou et al. |
| 5,446,747 | A | 8/1995 | Berrou |
| 5,563,897 | A | 10/1996 | Pyndiah et al. |
| 6,065,147 | A | 5/2000 | Pyndiah et al. |
| 6,119,264 | A | 9/2000 | Berrou et al. |
| 6,122,763 | A | 9/2000 | Pyndiah et al. |

FOREIGN PATENT DOCUMENTS

| EP | 0 681 382 A2 | 11/1995 |
| EP | 0 735 696 A2 | 10/1996 |
| FR | 2 675 970 A1 | 4/1991 |
| WO | WO 01/89123 A1 | 11/2001 |

OTHER PUBLICATIONS

Anader et al., IEEE 802.16 broadband wireless access working group; Harris Corporation Inc., IEEE 802-16-3C-01/58, (goolge.com) p. o to 86.*

(Continued)

*Primary Examiner*—Shelly A Chase
(74) *Attorney, Agent, or Firm*—Sterne, Kessler, Goldstein & Fox P.L.L.C.

(57) ABSTRACT

Methods and systems for modifying DOCSIS-based transmission paths for communication in higher frequency and/or wireless environments, such as wireless terrestrial communication systems and satellite communication systems. An inner turbo-code is combined with a DOCSIS based Reed-Solomon ("RS") forward error correction ("FEC") coding scheme, to produce a concatenated turbo-RS code (other FEC codes can be utilized). In phase and quadrature phase ("I-Q") processing is utilized to enable relatively low cost up-converter implementations. The I-Q processing is preferably performed at baseband, essentially pre-compensating for analog variations in the transmit path. Power amplifier on/off control capable of controlling on/off RF power control of remote transmitters is modulated on a transmit cable to reduce the need for a separate cable.

42 Claims, 8 Drawing Sheets

OTHER PUBLICATIONS

*Research and Development: Comunications/ Turbo Coding*, from http://www.xenotran.com/turbo_tech_error_turbo.html, 5 pages (last visited Mar. 11, 2002).

Ryan, W.E., "A Turbo Code Tutorial," *Proc. IEEE Globecom '98*, IEEE, 7 pages (1998).

*Telecommunications and Mission Operations Directorate—DSN Technology Program*, from http://www331.jpl.nasa.gov/public/TurboForce.GIF, 1 page (last visited Mar. 11, 2002).

Valenti, M.C., "Turbo codes and Iterative Processing," *IEEE New Zealand Wireless Communications Symposium*, 42 pages including tutorial slides (Nov. 1998).

European Search Report for EP 03 01 7352, dated Oct. 27, 2006, 2 pages.

Alessi, George et al., "Adapting the DOCSIS Protocols for Military Point-to Multipoint Wireless Links," MILCOM 2000. 21$^{st}$ Century Military Communications Conference Proceedings, Oct. 22-25, 2000, Piscataway, NJ, pp. 80-84.

Arunachalam, Arun, "Global Standardization Efforts of BWI Systems Based on Cable Modem," Emerging Technologies Symposium: Broadband, Wireless Interent Access, 2000 IEEE Apr. 10-11, 2000, Piscataway, NJ, pp. 1-4.

D'Luna, Lionel J. et al., "A Single-Chip Universal Cable Set-Top Box/Modem Transceiver," IEEE Journal of Solid-State Circuits, IEEE Service Center, Piscataway, NJ, vol. 34, No. 11, Nov. 1999, pp. 1647-1660.

\* cited by examiner

TURBO-CODING DOCSIS INFORMATION FOR SATELLITE COMMUNICATION

BACKGROUND OF THE INVENTION

1. Field of the Invention

The present invention is directed to methods and systems for implementing Data Over Cable Service Interface Specification ("DOCSIS") media access protocols, and derivatives thereof, in relatively high frequency applications, such as satellite internet service communications.

2. Related Art

Data, such as internet communication data, can be communicated over cable television lines using cable television modems that comply with Data Over Cable Service Interface Specification ("DOCSIS") media access protocols, and derivatives thereof. A variety of enterprises have invested in DOCSIS-compliant components and infrastructures.

Data can also be communicated with wireless systems, such as satellite communication systems. Wireless systems, however, tend to have requirements to operate with lower signal to noise ratios than DOCSIS systems. Wireless systems also typically utilize frequencies that are relatively much higher than frequencies used in conventional DOCSIS systems. Wireless communication systems, such as satellite communication systems, are, thus, generally not compatible with DOCSIS systems.

What are needed, therefore, are methods and systems for utilizing DOCSIS media access protocols, and derivatives thereof, in wireless communication applications, such as satellite communication systems.

BRIEF SUMMARY OF THE INVENTION

The present invention is directed to methods and systems for modifying DOCSIS-based transmission paths for communication in higher frequency and/or wireless environments, such as wireless terrestrial communication systems and satellite communication systems. In accordance with the invention, an inner turbo-code is combined with a DOCSIS based Reed-Solomon ("RS") forward error correction ("FEC") coding scheme, to produce a concatenated turbo-RS code (other FEC codes can be utilized). In-phase and quadrature-phase ("I-Q") processing is utilized to enable relatively low cost up-converter implementations. Power amplifier on/off control capable of controlling on/off RF power control of remote transmitters is modulated on a transmit cable to remove the need for a separate cable.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION OF THE INVENTION

Table of Contents

I. Introduction
II. Relatively High-Frequency Wireless DOCSIS Gateway
   A. Turbo-Coding DOCSIS Data
   B. Low Frequency I & Q Processing of Turbo-Coded DOCSIS Data
      1. Demultiplexer
      2. I-Q Interpolation
      3. Multiply by Complex Exponential
      4. Amplitude and Phase Shift
      5. x/sin(x) Compensation
      6. D.C. Offset
      7. Rounding
   C. Power Amplifier On/Off Control
III. Method for Modifying DOCSIS Transmission Paths for Wireless Environments
IV. Conclusions

I. INTRODUCTION

Figure 1:
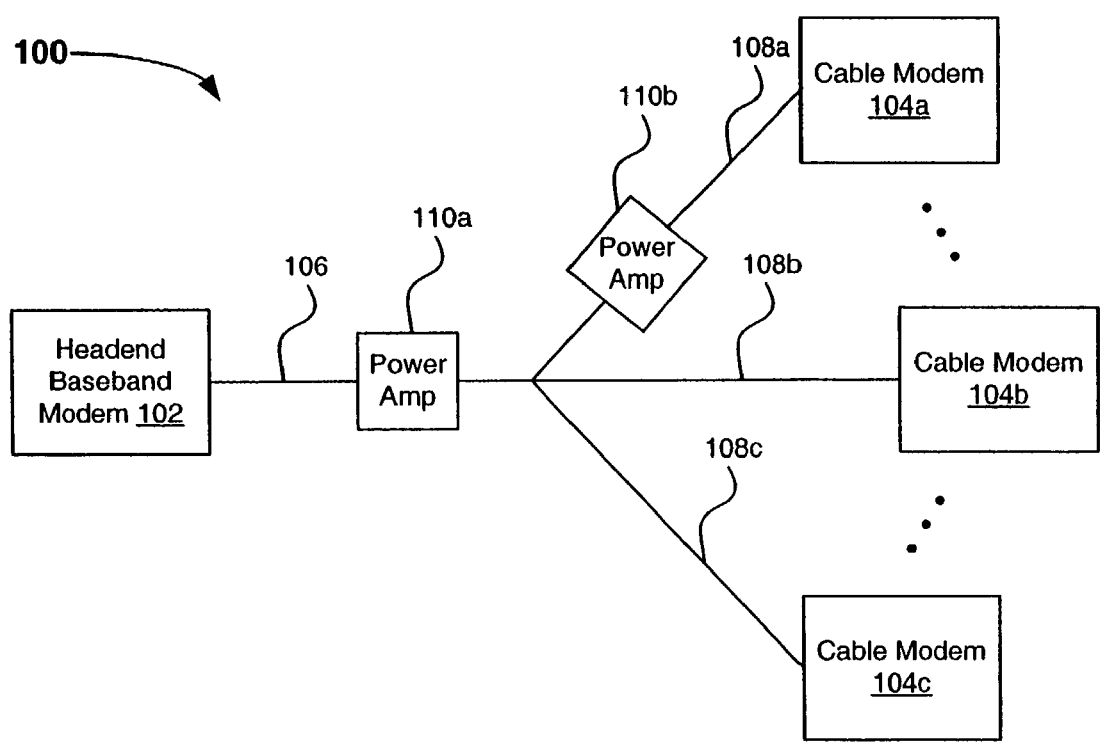
FIG. 1 is a block diagram of a cable modem communication system 100.

FIG. 1 is a block diagram of a cable modem communication system 100, including a headend baseband modulator/demodulator ("headend") 102 that communicates with a plurality of cable modulators/demodulators ("modems") 104 through a primary cable 106, which branches to user cables 108. The cable modems 104 demodulate data from the headend 102, and modulate data to be transmitted to the headend 102. One or more optional intermediate power amplifiers 110 can be placed along the cables 106 and/or 108 to boost signal strength. The cables 106 and 108 are relatively noiseless compared to wireless communication systems. The relatively low noise, the optional intermediate power amplifiers 110, and relatively short distances involved, provide the cable modem communication system 100 with a relatively high signal-to-noise ratio ("SNR").

The communication paths from the headend 102 to the users 104 are called down-stream paths or channels. The communication paths from the users 104 to the headend are called up-stream paths or channels.

In conventional DOCSIS systems, upstream channels are time division multiple access ("TDMA") channels, where multiple cable modems share an upstream channel. The headend assigns bandwidth to the cable modems by means of time-slot mapping ("MAP") messages that are broadcast to users of a given upstream channel. The MAP messages contain information allowing each user to burst an appropriate type of data on the upstream channel at an appropriate time. In conventional DOCSIS systems, the upstream data bursts are typically encoded with Reed Solomon (RS) forward error correction ("FEC"), to increase the reliability of the data reception at the headend. In conventional DOCSIS systems, upstream signals to the headend are transmitted at relatively low frequencies (e.g., in the range of 5-65 MHz). A variety of enterprises have invested in DOCSIS-compliant infrastructures.

It would be useful to utilize DOCSIS-compliant infrastructures to communicate with users via wireless systems, such as satellite. Wireless systems, however, tend to have lower SNRs than wire-based systems. Wireless systems also tend to use frequencies that are higher than frequencies used in conventional DOCSIS systems. For example, in satellite applications, typical frequency bands include Ku (e.g., 14-14.5 GHz) and Ka (e.g., 29.5-30 GHz) bands. Other potential wireless applications use different upstream bands. Conventional DOCSIS-compliant infrastructures are, thus, generally not compatible with wireless communication systems, such as satellite communication systems.

Figure 2:
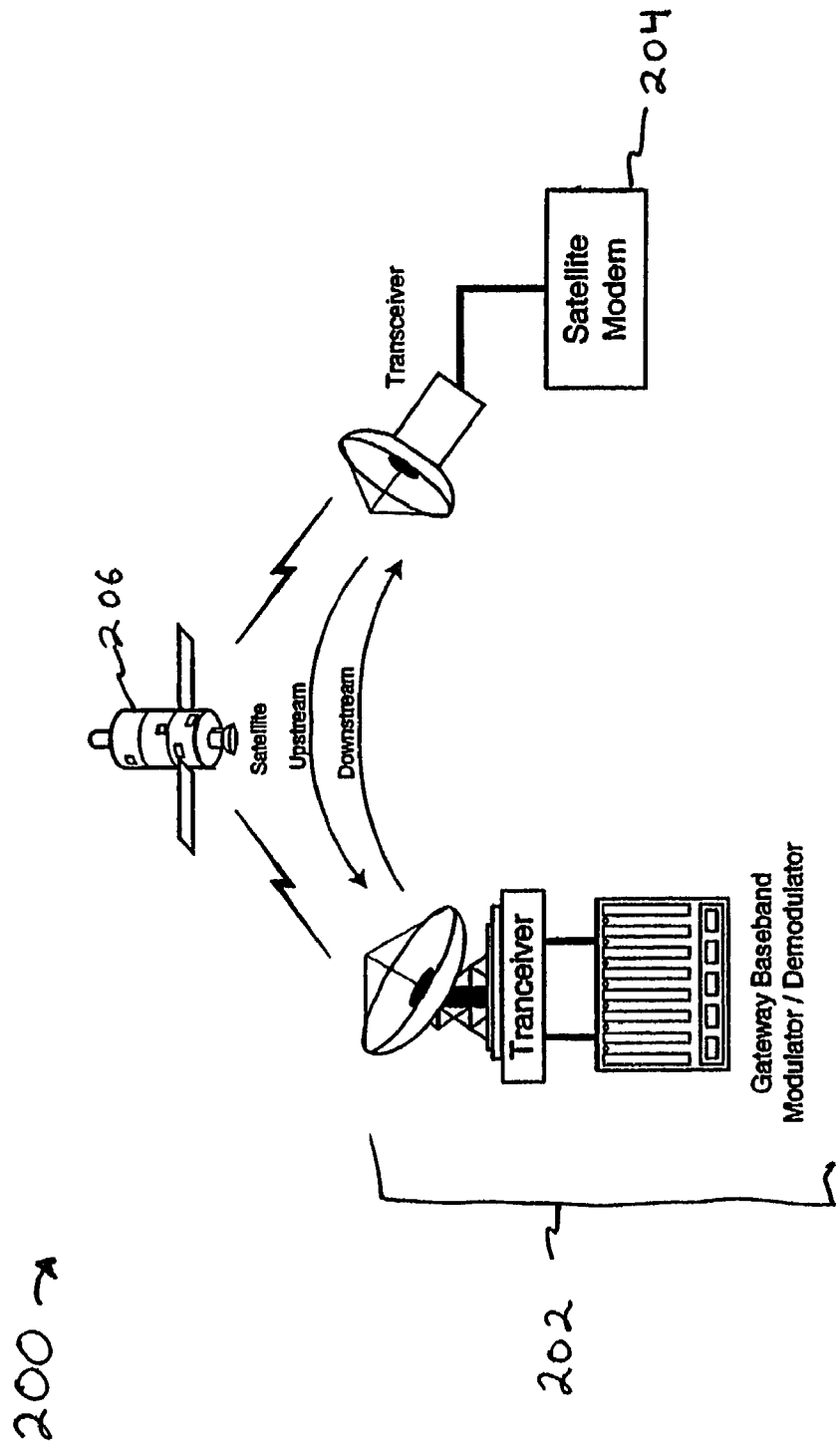
FIG. 2 is an example block diagram of a two-way satellite communication system 200, including a satellite modem 204.

FIG. 2 is an example block diagram of a two-way satellite communication system 200, wherein a gateway baseband modem ("gateway") 202 communicates with one or more users, illustrated here as a satellite modem 204, through a satellite 206. A communication path from the gateway 202 to the satellite modem 204 is called a down-stream channel. A communication path from the satellite modem 204 back to the gateway 202 is called an up-stream channel.

Higher frequency systems, such as the satellite communication system 200, typically utilize multiple (2 or more) up-conversion stages. Each up-conversion stage typically includes appropriate filters and amplifiers. If a standard up-conversion approach is used, an input signal centered at an intermediate frequency ("IF") is multiplied (mixed) with a local oscillator ("L.O."). At the output of the mixer, images of the input spectrum are created at the L.O. frequency plus the IF, and at the L.O. frequency minus the IF. The main purpose of the filters is to remove one of these images. The resulting output frequency is either a higher IF (say $IF_2$) or the radio frequency ("RF"), if the output is a final frequency.

If the input IF is relatively low (e.g. 5 to 65 MHz frequencies of standard DOCSIS) and the second IF is relatively high, then the required filtering is relatively difficult and expensive. The need to tune the center frequencies over a fairly wide range, but use fixed filters must also be accommodated in the design. For these reasons, converting standard DOCSIS 5-65 MHz based signals to satellite frequencies requires a minimum of three stages: (1) up-convert to a fairly high (e.g., L-band or S-band) frequency followed by a difficult to implement filter, (2) down-convert to a second IF using a programmable frequency L.O. that has the required tuning range, and then (3) up-convert the $2^{nd}$ IF to the desired satellite frequency. Use of 3 up-conversion stages (rather than 2) coupled with the requirement for a hard-to-implement filter makes this approach more expensive than the alternative approach that is a subject of this invention.

In FIG. 2, distances between the gateway 202 and the satellite 206, and between the satellite 206 and the satellite modem 204, are much greater than distances in the cable modem communication system 100. Also, there are no intermediate power amplifiers as in the cable modem communication system 100. Received signal levels and SNR in the satellite communication system 200 thus tend to be relatively small. Conventional DOCSIS systems and components are thus not suitable for wireless communication systems, such as the satellite communication system 200.

In TDMA systems, it can be useful to control the on/off times of the subscriber's final amplifier stage (often referred to as the power amplifier). For example, it would be useful to turn on the power amplifier shortly before a burst occurs, and to turn it off shortly after the burst has ended. This would reduce the noise level at the gateway because it ensures that non-active transmitters are not producing noise in the channel.

In higher-frequency applications, such as satellite applications, the final power amplifier is often physically located in a separate outdoor unit ("ODU"), which is connected to an indoor burst modulator via a cable. An amplifier on-off control signal would typically require an additional cable, which adds cost to the communication system. Thus, what are also needed are methods and systems for controlling the on/off switching of a power amplifier without additional cabling.

II. RELATIVELY HIGH-FREQUENCY WIRELESS DOCSIS GATEWAY

In accordance with the invention, DOCSIS-based transmission paths are modified for communication in higher frequency and/or wireless environments, such as wireless terrestrial communication systems and satellite communication systems. The present invention thus enables the extension of DOCSIS-based systems and components to lower SNR environments than are normally encountered in cable systems. The present invention also provides features that enable relatively low cost implementations of up-converters and power control. Example systems that can benefit from this invention include two-way satellite and broadband terrestrial wireless.

The present invention can be implemented in a wireless communication systems, such as, for example a wireless access termination system ("WATS") broadband terrestrial fixed wireless system and/or a satellite communication system. WATS systems typical utilize broadband terrestrial fixed wireless modems. Satellite systems typically utilize satellite modems.

The invention includes multiple features that can be implemented alone and/or in various combination with one another. The features include, without limitation:

an inner turbo-code combined with a DOCSIS based Reed-Solomon ("RS") forward error correction ("FEC") coding scheme, to produce a concatenated turbo-RS code (other FEC codes can be utilized);

in phase and quadrature phase ("I-Q") processing to enable relatively low cost up-converter implementations; and power amplifier on/off control capable of controlling on/off RF power control of remote transmitters, using an upstream channel cable.

One or more aspects of the invention can be implemented in an integrated circuit, alone or in combination with one another and/or in combination with one or more DOCSIS components.

The invention enables the extension of DOCSIS-based up-streams to lower SNR environments than are normally encountered in cable systems. The invention also provides features that enable relatively low cost implementations of up-converters and power control. Example systems that can benefit from this invention include two-way satellite and broadband terrestrial wireless. The invention implements a combination of concatenated RS-Turbo encoding, I-Q interface processing and high power amplifier (HPA) control.

A. Turbo-Coding DOCSIS Data

Conventional DOCSIS systems encode data with Reed Solomon encoding. This is sufficient for relatively low noise environments, such as cable modem systems. For higher noise environments, however, additional Reed Solomon encoding may not be sufficient. In accordance with the invention, Reed Solomon encoded data is further encoded in an inner turbo code.

Figure 3:
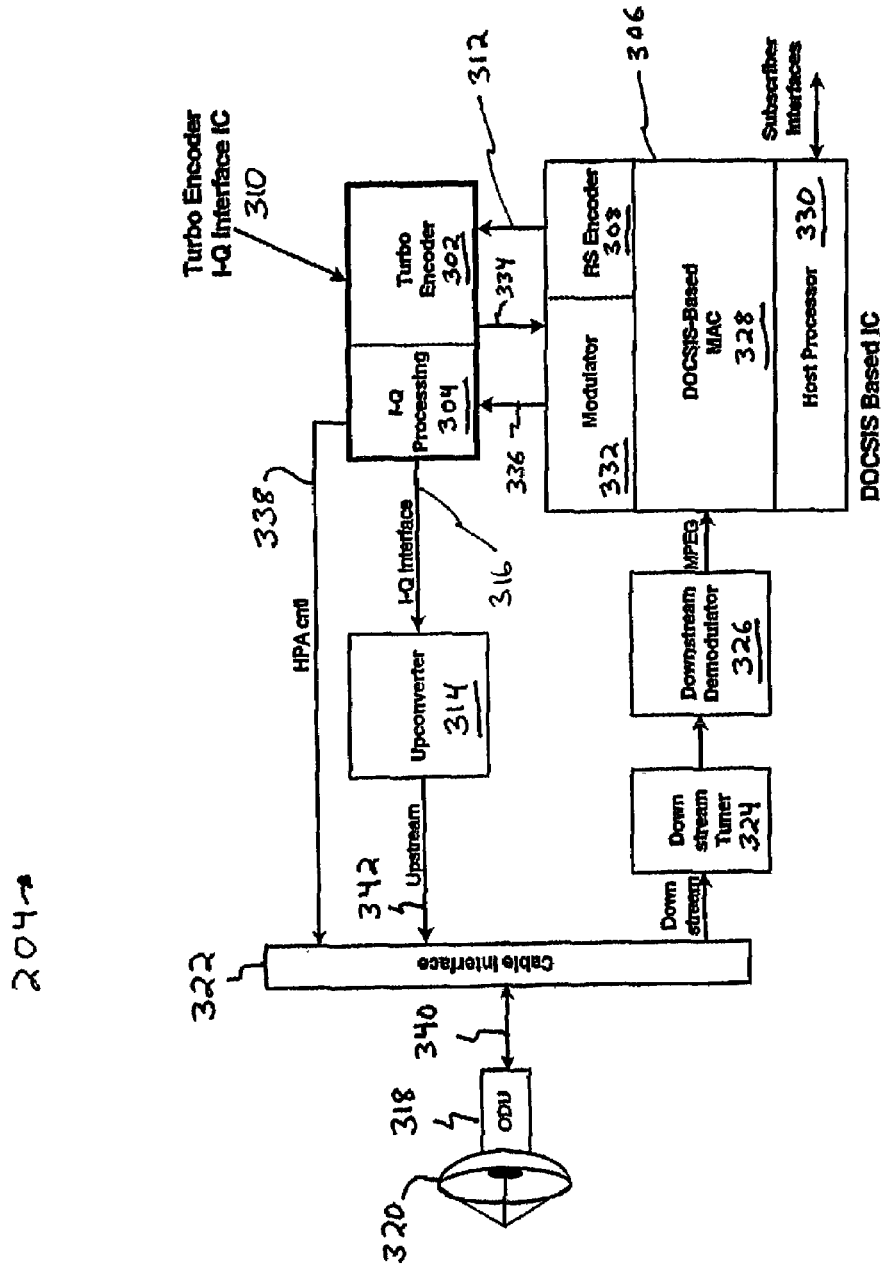
FIG. 3 is an example high-level block diagram of the satellite modem 204, in accordance with the invention, including a turbo encoder 302 and an I-Q processing module 304.

FIG. 3 is an example high-level block diagram of the satellite modem 204, in accordance with the invention. The satellite modem 204 includes a DOCSIS based circuit 306, which can be a conventional DOCSIS based circuit. In the example of FIG. 3, the DOCSIS based circuit 306 is illustrated as an integrated circuit. Alternatively, the DOCSIS based circuit 306 can include a number of integrated circuits and/or discrete circuits and/or in software/firmware.

The DOCSIS based circuit 306 includes a host processor 330 coupled to a DOCSIS based media access controller ("MAC") 328. The DOCSIS based MAC 328 interfaces with an application executing on the host processor 330. The DOCSIS based MAC 328 formats data in accordance with DOCSIS standards. The host processor 330 interfaces with a subscriber unit such as a personal computer (not shown in FIG. 3). The DOCSIS based circuit 306 further includes a Reed Solomon ("RS") encoder 308 and a modulator 332, both of which are described below.

The DOCSIS based MAC 328 also interfaces with a transmit path and a receive path. In the example of FIG. 3, the receive path includes a downstream tuner 324 and a downstream demodulator 326. The transmit path includes the RS encoder 308, the modulator 332, a turbo encoder I-Q interface circuit 310, and an up-converter 314. The turbo encoder I-Q interface circuit 310 includes a turbo encoder 302 and an I-Q processing module 304. In the example of FIG. 3, the turbo encoder I-Q interface circuit 310 is illustrated as an integrated circuit. Alternatively, the turbo encoder I-Q interface circuit 310 includes multiple integrated circuits and/or discrete components.

The transmit and receive paths are coupled to an outdoor unit ("ODU") 318, which includes an antenna 320, through a cable interface 322. The ODU 318 typically includes a final power amplifier in the transmit path.

Figure 8:
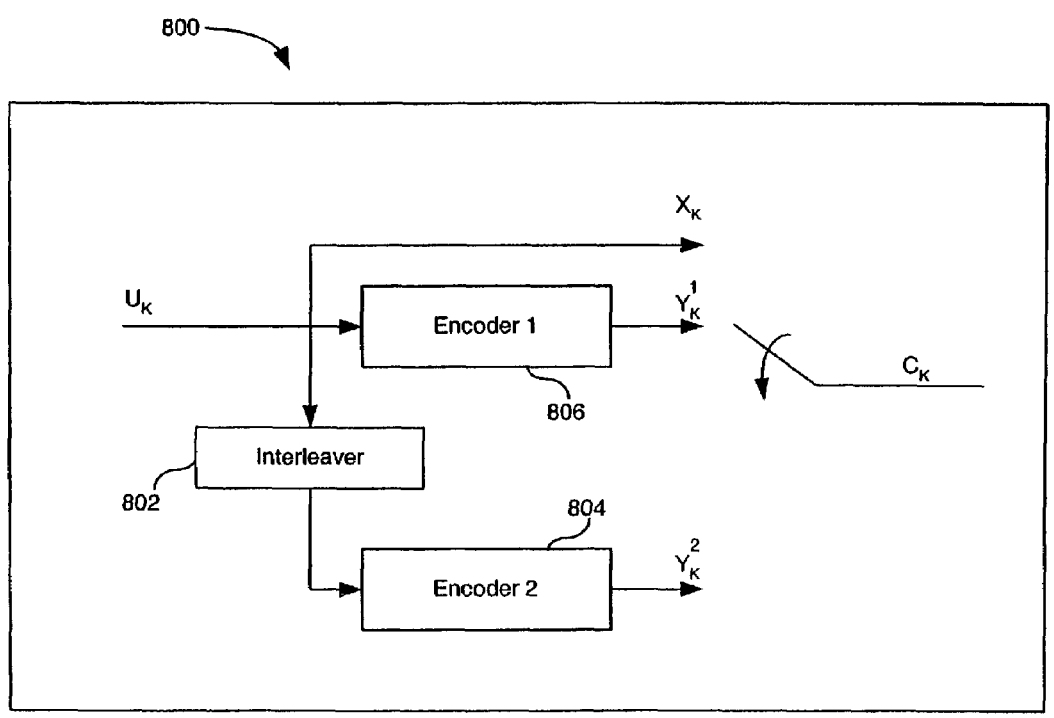
FIG. 8 is a block diagram of an example turbo-encoder 800.

Turbo encoding is now described. Turbo encoders typically use at least two convolutional component encoders. Turbo encoders can also be based on block encoding techniques, such as Hamming codes. Turbo codes include, for example, and without limitation, Parallel Concatenated Convolutional Codes (PCCC), Serial Concatenated Convolutional Codes (SCCC), and Hybrid Concatenated Convolutional Codes (HCCC). Typically, turbo codes are arranged as PCCC. FIG. 8 is a block diagram of an example PCCC turbo encoder 800 including an interleaver 802, a first encoder 806, and a second encoder 804. FIG. 8 illustrates a systematic code (the output codeword contains the intput-bits $U_k$). Turbo codes may also be non-systematic. Turbo codes are practical codes due to their performance at low SNR.

The invention is not, however, limited to the PCCC turbo encoder 800. Based on the description herein, one skilled in the relevant art(s) will understand that other turbo encoders and other turbo-encoder schemes can be uses. Turbo encoders are described in:

Valenti, Matthew C., "Turbo Codes and Iterative Processing," Mobile and Portable Radio Research Group, Virginia Polytechnic Institute and State University, Blacksburg, Va.;

"Research and Development: Communications/Turbo Coding," Xenotran, Mar. 11, 2002;

W. E. Ryan, "A Turbo Code Tutorial," Proc. IEEE Globecom'98, 1998; and

"Telecommunications and Mission Operations Directorate—DSN Technology Program: Communications Systems Analysis: Turbo Codes," Mar. 3, 2002.

All of which are hereby incorporated by reference in their entireties.

Referring back to FIG. 3, the satellite modem 204 combines an inner turbo code with conventional DOCSIS based Reed-Solomon ("RS") encoding. The satellite modem 204 thus implements a concatenated RS forward error correction ("FEC") encoding in the transmit path. Other FEC codes can be used. In particular, the inner turbo code could be replaced with a conventional convolutional code. The outer RS code could be removed leaving only the inner turbo code. The latter arrangement is really just a subset of the RS-turbo concatenated approach where the error correcting ability "T" of the RS code is set to zero. The driving idea in satellite applications is to use FEC codes that allow efficient operation in lower SNR environments than is generally possible with RS codes alone.

Figure 4:
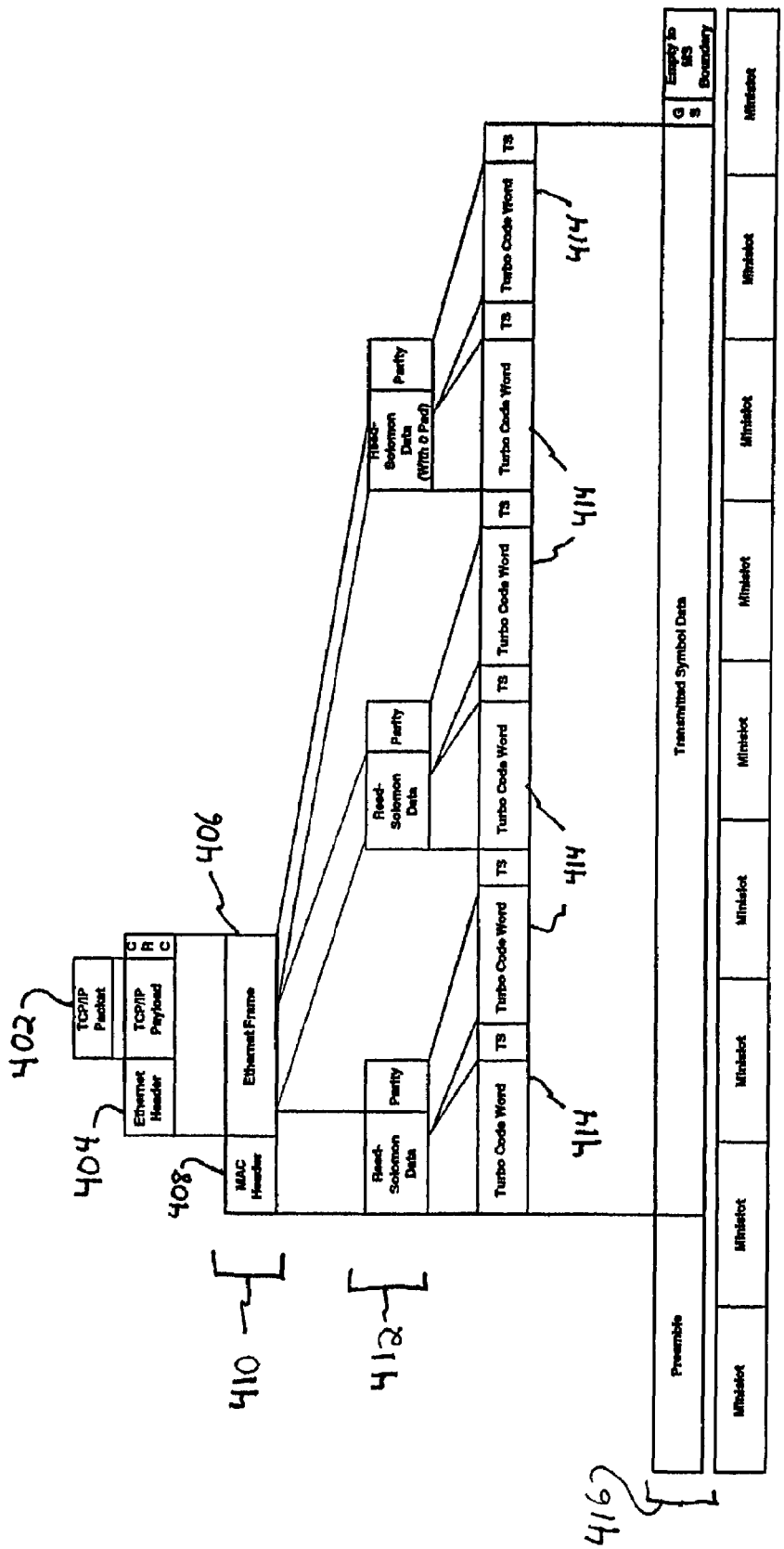
FIG. 4 illustrates generation of data bursts having RS and turbo encoding, in accordance with the invention.

FIG. 4 illustrates generation of data bursts having RS and turbo encoding. The process begins with a transmission control protocol/internet protocol ("TCP/IP") packet 402. Ethernet header information 404 is appended to the TCP/IP packet 402, resulting in an Ethernet frame 406. DOCSIS MAC header information 408 is appended to the Ethernet frame 406. These two steps can be performed as in conventional DOCSIS systems. These two steps result in DOCSIS packets 410.

RS encoding is applied to the DOCSIS packets 410 by the RS encoder 308. This can be performed as in conventional DOCSIS systems. This results in RS code words 412. The RS code words 412 are provided to the turbo encoder 302, illustrated in FIG. 3 at 312. In the turbo encoder 302, the RS code words 412 are encoded by the inner turbo code into turbo code words 414. Optional tailing symbols ("TS") are appended to the turbo code words 414. The tailing symbols are used to drive turbo code blocks to a known state for proper decoding. These count as overhead symbols but not as turbo code word symbols.

RS code word lengths and turbo code word sizes are preferably selected such that each RS code word results in an integer number of turbo code words. For example, if a rate ½ turbo code word size contains 280 QPSK symbols, then the turbo code word contains 280 RS bits (35 bytes) from the outer code and 280 turbo code parity bits. If there are to be two turbo code words per RS code word (as in the example of FIG. 4), then the RS code word size is selected to be 70 bytes. Other sizes and combinations are possible.

The turbo code words 414, appended with tailing symbols, are output from the turbo encoder 302. A preamble is appended to the turbo code word, resulting in the data burst 416. This can be performed as in conventional DOCSIS systems.

The resulting data burst 416 is modulated in the modulator 332. Modulation can include symbol mapping, Nyquist filtering and interpolation. Insertion of the preamble may also occur in the modulator 332. The modulation can be performed as in conventional DOCSIS systems. The modulation provides a complex baseband I-Q waveform 336 (FIG. 3) to the I-Q processing module 304. The complex baseband I-Q waveform 336 is provided to the I-Q processing module 304 for further processing in accordance with the invention, as described below with respect to FIG. 5.

B. Low Frequency I & Q Processing of Turbo-Coded DOCSIS Data

In a wireless environment, such as the satellite transmission system 200, data is up-converted to a relatively high frequency for wireless transmission. In FIG. 3, the up-converter 314 up-converts processed I-Q data 316 to a satellite frequency for transmission by the antenna 320. The up-converter 314 includes analog components that can impart frequency, phase, and/or other types of variations to the processed I-Q data 316. In order to correct for these variations, the up-converter 314 can include correction circuitry. However, at higher frequencies, correction circuitry becomes more expensive. In accordance with the invention, therefore, one or more of the frequency, phase, and/or other types of variations are pre-compensated for at baseband within the I-Q processing module 304. Frequency up-conversion can then be performed in relatively coarse steps, with relatively inexpensive components. For example, up-conversion can be performed from baseband to a range of 950 to 1450 MHz by the up-converter 314. The ODU 318 then block up-converts the up-converter IF range to the final RF frequencies. Inexpensive up-conversion components can include, for example, components used in off-the-shelf cellular telephone applications. As discussed above, when up-converting a signal to a relatively high satellite-type frequencies, there are implementation advantages starting with orthogonal "I-Q" inputs rather than low 5-65 MHz IF signals.

Figure 5:
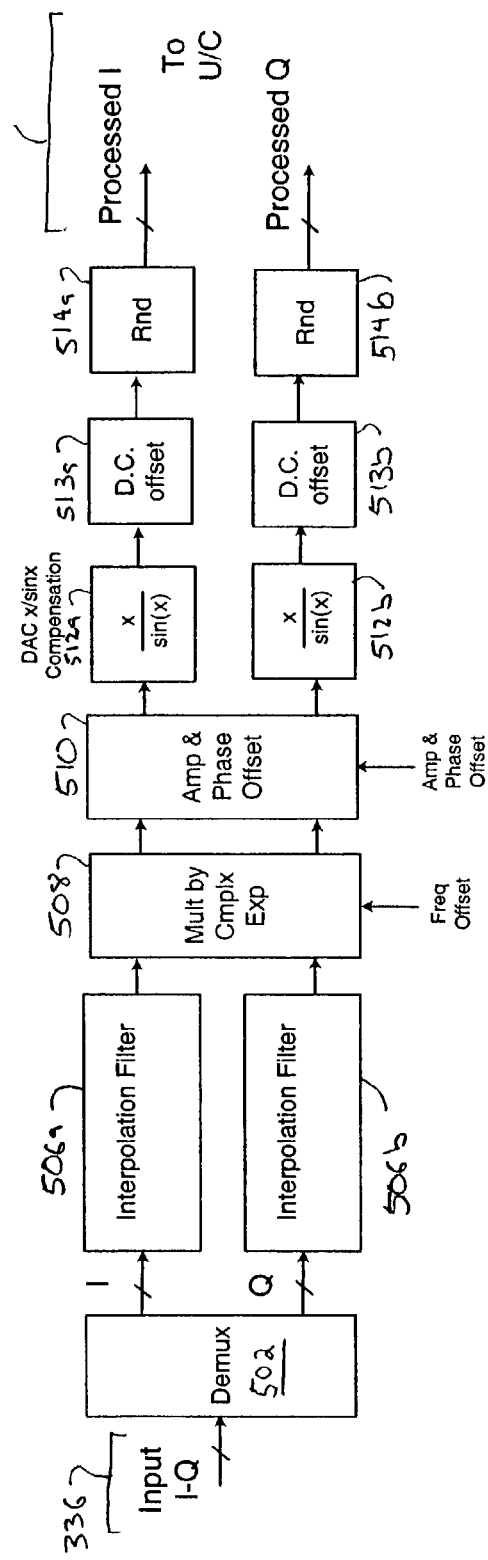
FIG. 5 is an example block diagram of the I-Q processing module 304.

Operation of the I-Q processing module 304 is now described. FIG. 5 is an example block diagram of the I-Q processing module 304. The I-Q processing module 304 includes one or more of: an optional demultiplexer 502; I and Q interpolation filters 506; a multiply-by-complex exponential module 508; an amplitude and phase offset module 510; I and Q x/sin(x) modules 512; DC offset modules 513, and I and Q rounding modules 514, all of which are described below.

1. Demultiplexer

The I-Q processing module 304 receives the complex baseband I-Q waveform 336 from the modulator 332. The complex baseband I-Q waveform 336 is optionally interleaved to minimize the number of input paths (e.g., pins) to the I-Q processing module 304. When the complex baseband I-Q waveform 336 is interleaved, the I-Q processing module 304 includes the optional de-multiplexer 502. The demultiplexer 502 demultiplexes the interleaved complex baseband I-Q waveform 336 to recover separate the I and Q channels.

2. I-Q Interpolation Filters

DOCSIS standards can be implemented with a variety of sample rate modes. The I-Q processing module 304 accommodates the variety of sample rate modes in one or more of a variety of ways. For example, the I-Q processing module 304 can include circuitry for processing each of the different sample modes. Alternatively, the I-Q processing module 304 interpolates the input data to a common sample rate, and processes the common sample rate data in a common set of processing circuitry. Accordingly, in the example of FIG. 5, the I-Q processing module 304 includes the I and Q interpolation filters 506. The I and Q interpolation filters 506 interpolate input samples to a common rate. The input samples can be samples of the demultiplexed interleaved complex baseband I-Q waveform 336, as output from the demultiplexer 502. For example, if the demultiplexed interleaved complex baseband I-Q waveform 336 is sampled at 4 times the symbol rate, the DOCSIS upstream symbol rates of 160 ksps, 320 ksps, 640 ksps, and 1.28 Msps, can be interpolated according to Table 1.

TABLE 1

| Symbol Rate (kHz) | Input Sample Rate (kHz) | Interpolation Factor | Output Sample Rate (kHz) |
|---|---|---|---|
| 160 | 640 | 8 | 5120 |
| 320 | 1280 | 4 | 5120 |

TABLE 1-continued

| Symbol Rate (kHz) | Input Sample Rate (kHz) | Interpolation Factor | Output Sample Rate (kHz) |
|---|---|---|---|
| 640 | 2560 | 2 | 5120 |
| 1280 | 5120 | 0 | 5120 |

The values in Table 1 are examples. Other interpolation factors are possible including both rational and irrational factors.

3. Multiply by Complex Exponential

There is a need to be able to center the upstream spectrum in a very precise location in the spectrum. Analog components in the upstream path can have unknown frequency offsets. Compensation and precise frequency control of these elements can be expensive. Therefore, it is desirable to be able to perform fine frequency control digitally at baseband.

Accordingly, the I-Q processing module 304 includes the multiply-by-complex-exponential module 508 that performs a programmable complex frequency shift. At a given sample time k, the I and Q outputs $I_o(k)$ and $Q_0(k)$ are given in terms of the inputs I(K) and Q(k) by equations 1 and 2, respectively:

$$I_0(k) = I(k)\cos\left(2\pi\frac{f_x}{f_s}k\right) - Q(k)\sin\left(2\pi\frac{f_x}{f_s}k\right) \quad \text{Eq. 1}$$

$$Q_0(k) = I(k)\sin\left(2\pi\frac{f_x}{f_s}k\right) + Q(k)\cos\left(2\pi\frac{f_x}{f_s}k\right) \quad \text{Eq. 2}$$

where $f_S$ is the sample rate and $f_x$ is a desired frequency shift. The ability to perform this fine frequency shift digitally allows external frequency synthesizers in the up-converter to have relatively large step sizes. Continuous fine frequency control upstream output is achieved by a combination of the coarse frequency steps of the external synthesizer and the fine frequency control of the turbo encoder I-Q interface 310.

4. Amplitude and Phase Shift

Figure 6:
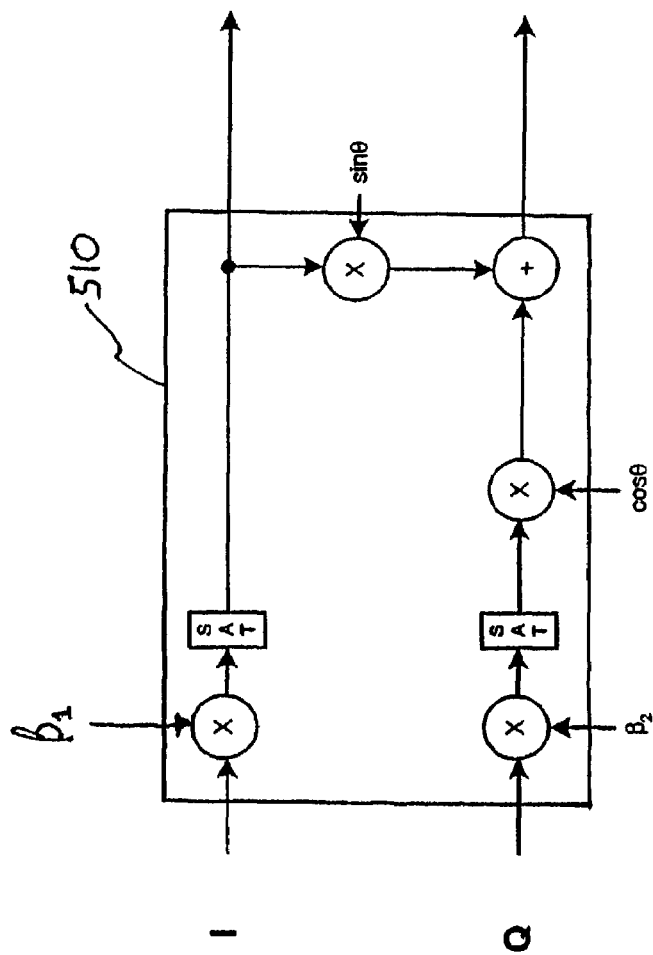
FIG. 6 is a block diagram of an optional amplitude and phase offset module 510 within the I-Q processing module 304.

The amplitude and phase shift module 510 corrects for amplitude and phase variations in the satellite communication system 200. Amplitude and phase shift can be digitally induced by the amplitude and phase shift module 510 to counteract effects of opposite amplitude and phase variations encountered in the analog components of the up-converter 314. FIG. 6 illustrates example amplitude and phase adjustments performed by the amplitude and phase offset module 510, where $\beta_1$ and $\beta_2$, sin θ and cos θ are preferably programmable values.

5. x/sin(x) Compensation

A final stage of the I-Q processing module 304 or an initial stage of the up-converter 314 includes one or more digital-to-analog converters ("DACs"). DACs inherently have sin (x)/x roll-off distortion. Accordingly, the I and Q x/sin(x) modules 512 digitally pre-compensate for the DAC sin(x)/x roll-off distortion at baseband.

6. D.C. Offset

Elements in the upconverter can induce D.C. biases that distort the signal and limit performance such as mixer image rejection. Accordingly, the digital D.C. offset module 513 adjusts the D.C. level of the signal up or down to compensate for this distortion.

7. Rounding Stage

The I and Q rounding modules 514 round the digital output of the I and Q x/sin(x) modules 512 prior to the digital-to-analog conversion described above. The DACs described above can be incorporated within an integrated circuit that generates I and Q outputs.

C. Power Amplifier On/Off Control

In FIG. 3, a power amplifier on/off control signal 338 is provided to the ODU 318, through the cable interface 322. The power amplifier on/off control signal 338 controls on/off switching of a power amplifier within the ODU 318. In accordance with the invention, the power amplifier on/off control signal 338 is provided from the cable interface 322 to the ODU 318 via a cable 340, which also carries transmit and receive signals to and from the ODU 318. In other words, the cable 340 can simultaneously carry upstream and downstream data signals, ODU control signals, D.C. power and the power amplifier on/off control signal 338.

The power amplifier on/off control signal 338 is generated by a power amplifier interface, which is optionally located within the I-Q processing module 304. The power amplifier interface generates the power amplifier on/off control signal 338 starting at a programmable period prior to the start of a data burst. The programmable lead time provides the power amplifier with sufficient time to reach steady state before the data burst is sent to the ODU 318. The power amplifier on/off control signal 338 stays on over the entire transmission burst and ends a programmable period after the transmission has completed. The power amplifier on/off control signal 338 can be selectable as either a constant voltage or as an on-off keyed sinusoid or square wave.

The power amplifier on/off control signal 338 can be used to on-off key ("OOK") modulate a sinusoid or square wave. Such an OOK power amplifier on/off control signal 338 can then be multiplexed onto the cable 340 simultaneously with the other signals. The ODU 318 can receive the OOK signal and use it to turn the power amplifier on and off at the proper times. Other modulation methods of the power amplifier on/off signal are also possible.

III. METHOD FOR MODIFYING DOCSIS TRANSMISSION PATHS FOR WIRELESS ENVIRONMENTS

Figure 7:
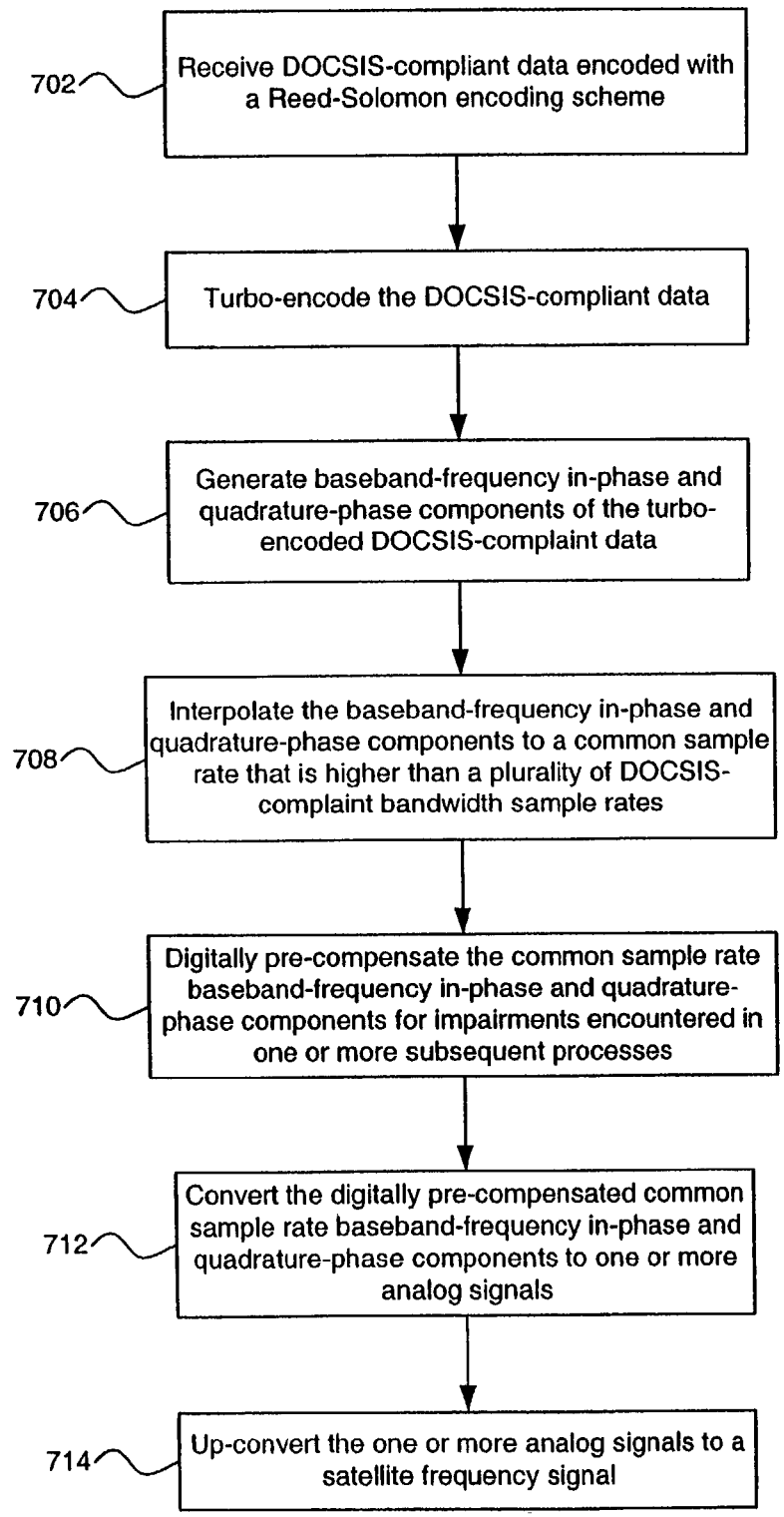
FIG. 7 is a process flowchart 700 for modifying DOCSIS transmission paths for wireless environments, in accordance with the invention.

FIG. 7 is a process flowchart 700 for modifying DOCSIS transmission paths for wireless environments, in accordance with the invention. The process flowchart 700 is described with reference to one or more of FIGS. 1-6. The process flowchart 700 is not, however, limited to the examples provided in FIGS. 1-6. Based on the description herein, one skilled in the relevant art(s) will understand that the process flowchart 700 can be implemented in other environments as well.

The process begins at step 702, which includes receiving DOCSIS-compliant data encoded with a Reed-Solomon encoding scheme. In the example of FIG. 3, the turbo encoder I-Q interface 310 receives RS encoded DOSCIS-compliant data 312 from the encoder 308.

Step 704 includes turbo-encoding the DOCSIS-compliant data. In the example of FIG. 3, the encoder 302 turbo encodes the RS encoded DOSCIS-compliant data 312, as illustrated in FIG. 4.

Step 706 includes generating baseband-frequency in-phase and quadrature-phase components of the turbo-encoded DOCSIS-compliant data. In FIG. 3, the modulator 332 receives and modulates the data burst 416 (FIG. 4), (data burst 334 in FIG. 3). The modulator 332 outputs complex baseband I-Q waveform 336 to the I-Q processing module 304.

Step 708 includes interpolating the baseband-frequency in-phase and quadrature-phase components to a common sample rate that is higher than a plurality of DOCSIS-compliant bandwidth sample rates. In FIG. 5, the I and Q interpolation filters 506 interpolate the complex baseband I-Q waveform 336 to a common sample rate.

Step 710 includes digitally pre-compensating the common sample rate baseband-frequency in-phase and quadrature-phase components for impairments encountered in one or more subsequent processes. In FIG. 5, the I-Q processing module 304 optionally includes one or more of the I and Q multiply-by-complex exponentials modules 508, the I and Q amplitude and phase offset modules 510, the I and Q x/sin(x) modules 512, and the I and Q rounding modules 514, each of which is described above.

Step 712 includes converting the digitally pre-compensated common sample rate baseband-frequency in-phase and quadrature-phase components to one or more analog signals. In FIG. 5, digital-to-analog conversion is performed within the turbo encoder I-Q interface 310, which can be a single integrated circuit, in the up-converter 314, or in between the turbo encoder I-Q interface 310 and the up-converter 314.

Step 714 includes up-converting the one or more analog signals to a satellite frequency signal. In FIG. 5, up-conversion is performed by the up-converter 314 and the ODU 318. Up-conversion can be performed in a single step or in a plurality of up-conversion steps. A combination of the up-converter 314 and the ODU 318 outputs a satellite frequency DOCSIS based signal 342 to the antenna 320.

IV. CONCLUSIONS

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for processing data generated in compliance with a Data Over Cable Service Interface Specification (DOCSIS) standard, for satellite communication, comprising:
    (1) receiving DOCSIS-compliant data encoded with a Reed-Solomon encoding scheme;

(2) turbo-encoding the DOCSIS-compliant data using an integrated circuit having a turbo encoder circuit;
(3) generating baseband-frequency in-phase and quadrature-phase components of the turbo-encoded DOCSIS-compliant data;
(4) interpolating the baseband-frequency in-phase and quadrature-phase components to a common sample rate that is higher than a plurality of DOCSIS-compliant bandwidth sample rates;
(5) digitally pre-compensating the common sample rate baseband-frequency in-phase and quadrature-phase components for impairments encountered in one or more subsequent processes;
(6) converting digitally pre-compensated common sample rate baseband-frequency in-phase and quadrature-phase components to one or more analog signals; and
(7) up-converting the one or more analog signals to a satellite frequency signal.

2. The method according to claim 1, wherein step (7) comprises:
(a) up-converting the one or more analog signals to a cellular telephone frequency signal; and
(b) up-converting the cellular telephone frequency signal to the satellite frequency signal.

3. The method according to claim 1, wherein step (7) comprises:
(a) up-converting the one or more analog signals to a first frequency signal having a frequency in a range of approximately 950 MHz to 1450 MHZ; and
(b) up-converting the first frequency signal to the satellite frequency signal.

4. The method according to claim 3, wherein step (7)(a) comprises up-converting the one or more analog signals to the first frequency signal using up-converter components designed for a cellular telephone.

5. The method according to claim 1, wherein step (5) comprises performing a programmable frequency shift operation on the common sample rate baseband-frequency in-phase and quadrature-phase components.

6. The method according to claim 5, wherein step (5) further comprises multiplying the common sample rate in-phase and quadrature-phase components by a complex exponential.

7. The method according to claim 1, wherein step (5) comprises performing amplitude and phase shift operations on the common sample rate baseband-frequency in-phase and quadrature-phase components.

8. The method according to claim 1, wherein step (5) comprises providing x/sin(x) compensation to the common sample rate baseband-frequency in-phase and quadrature-phase components, thereby compensating for digital-to-analog roll-off distortion encountered in the digital-to-analog converting.

9. The method according to claim 1, wherein step (5) comprises:
performing a programmable frequency shift operation on the common sample rate baseband-frequency in-phase and quadrature-phase components;
performing amplitude and phase shift operations on the common sample rate baseband-frequency in-phase and quadrature-phase components; and
providing x/sin(x) compensation to the common sample rate baseband-frequency in-phase and quadrature-phase components, thereby compensating for roll-off distortion encountered in the digital-to-analog converting.

10. The method according to claim 1, wherein step (3) comprises interleaving the baseband-frequency in-phase and quadrature-phase components, thereby reducing a number of pins needed to receive the in-phase and quadrature-phase components.

11. The method according to claim 1, wherein step (6) comprises rounding the digitally pre-compensated baseband-frequency in-phase and quadrature-phase components and converting the digitally rounded components to the one or more analog signals.

12. The method according to claim 3, further comprising:
(8) providing an amplifier on/off control signal and the first frequency signal through a common medium to an amplifier and to a satellite-frequency up-converter, respectively.

13. The method according to claim 12, wherein step (8) comprises selecting between a constant-voltage amplifier on/off control signal and a modulated on/off keyed amplifier control signal, wherein a frequency of the modulated on/off keyed amplifier control signal is different than the first frequency.

14. The method according to claim 12, wherein the modulated on/off keyed amplifier control signal is an on/off keyed sinusoid signal.

15. The method according to claim 12, wherein the modulated on/off keyed amplifier control signal is an on/off keyed square signal.

16. The method according to claim 12, wherein step (7) further comprises programming a lead time and a duration time for the amplifier on/off control signal.

17. The method according to claim 1, wherein step (1) comprises generating the DOCSIS-compliant information, and steps (1), (2), (4), and (5) are performed on a single integrated circuit.

18. A system for processing data generated in compliance with Data Over Cable Service Interface Specification-type (DOCSIS) standards, for satellite communication, comprising:
a DOCSIS data generator module, including a Reed-Solomon encoding module, configured to generate Reed-Solomon encoded DOCSIS-compliant data;
a turbo-encoding circuit, in an integrated circuit, coupled to an output of the DOCSIS data generator module;
an in-phase and quadrature-phase modulator coupled to an output of the turbo encoding module, configured to generate baseband-frequency in-phase and quadrature-phase components of turbo/Reed-Solomon encoded DOCSIS-compliant data;
a digital processing module coupled to outputs of the in-phase and quadrature-phase modulator, the digital processing module including an interpolation module configured to interpolate the baseband-frequency in-phase and quadrature-phase components to a common sample rate that is higher than a plurality of DOCSIS-compliant bandwidth sample rates, the digital processing module configured to pre-compensate the common sample rate in-phase and quadrature-phase components for impairments encountered in subsequent components;
a digital-to-analog converter coupled to an output of the digital processing module; and
a frequency up-converter module coupled to an output of the digital-to-analog converter.

19. The system according to claim 18, wherein the frequency up-converter module comprises:
a first frequency up-converter coupled to the output of the digital-to-analog converter, configured to output a cellular telephone frequency signal in a range of approximately 950 MHz to 1450 MHZ; and a satellite-frequency up-converter coupled to an output of the first frequency up-converter.

20. The system according to claim 19, wherein the first frequency up-converter uses off-the-shelf cellular telephone frequency components.

21. The system according to claim 18, wherein the digital processing module comprises a programmable frequency shift module coupled between the in-phase and quadrature-phase modulator and the digital-to-analog converter.

22. The system according to claim 21, wherein the programmable frequency shift module is configured to multiply the common sample rate in-phase and quadrature-phase components by a complex exponential.

23. The system according to claim 18, wherein the digital processing module comprises amplitude and phase shift modules coupled between the in-phase and quadrature-phase modulator and the digital-to-analog converter.

24. The system according to claim 18, wherein the digital processing module comprises an x/sin(x) compensation module coupled between the in-phase and quadrature-phase modulator and the digital-to-analog converter, configured to pre-compensate for sin(x)/x roll-off distortion is the digital-to-analog converter.

25. The system according to claim 18, wherein the digital processing module comprises:
a programmable frequency shift module including inputs coupled to outputs of the in-phase and quadrature-phase modulator;
amplitude and phase shift modules coupled to outputs of the programmable frequency shift module; and
a x/sin(x) module coupled between the amplitude and phase shift modules and the digital-to-analog converter.

26. The system according to claim 18, wherein the in-phase and quadrature-phase modulator is configured to interleave the in-phase and quadrature-phase components, thereby reducing a number of pins needed by the digital processing module to receive the in-phase and quadrature-phase components.

27. The system according to claim 18, wherein an output portion of the digital processing module comprises a digital rounding module including an output coupled to the digital-to-analog converter.

28. The system according to claim 18, wherein the turbo-encoding module and the digital processing module are implemented on a single integrated circuit chip.

29. The system according to claim 19, wherein:
the digital processing module comprises an amplifier on/off control signal generator; and
the frequency up-converter module includes a common-media output port that combines an output of the amplifier on/off control signal generator and an output of the cellular telephone frequency up-converter for transmission through a common media to the satellite frequency up-converter and to an amplifier coupled to the satellite frequency up-converter, respectively.

30. The system according to claim 29, wherein the amplifier on/off control signal generator comprises:
a selectable constant-voltage operation module configured to output the amplifier on/off control signal as constant-voltage levels; and
a selectable on/off keyed modulator configured to output the amplifier on/off control signal at a third frequency that is different than the cellular telephone frequency and the satellite frequency.

31. The system according to claim 30, wherein the on/off keyed modulator comprises a sinusoid on/off keyed modulator.

32. The system according to claim 30, wherein the on/off keyed modulator comprises a square-wave on/off keyed modulator.

33. The system according to claim 29, wherein the digital processing module further comprises a programmable lead time module and a programmable duration time module coupled to the amplifier on/off control signal generator.

34. The method according to claim 1, wherein steps (2), (4), and (5) are performed in an integrated circuit.

35. The method according to claim 1, wherein steps (2), (4), (5) and (6) are performed in an integrated circuit.

36. The system according to claim 18, wherein said turbo-encoder module and said digital processing module are integrated on an integrated circuit chip.

37. The system according to claim 18, wherein said turbo-encoder module, said digital processing module, and said digital-to-analog converter are integrated on an integrated circuit chip.

38. A system for processing data generated in compliance with a Data Over Cable Service Interface Specification (DOCSIS) standard, for satellite communication, comprising:
means for receiving DOCSIS-compliant data encoded with a Reed-Solomon encoding scheme;
means for turbo-encoding the DOCSIS-compliant data;
means for generating baseband-frequency in-phase and quadrature-phase components of the turbo-encoded DOCSIS-compliant data;
means for interpolating the baseband-frequency in-phase and quadrature-phase components to a common sample rate that is higher than a plurality of DOCSIS-compliant bandwidth sample rates;
means for digitally pre-compensating the common sample rate baseband-frequency in-phase and quadrature-phase components for impairments encountered in one or more subsequent processes;
means for converting digitally pre-compensated common sample rate baseband-frequency in-phase and quadrature-phase components to one or more analog signals; and
means for up-converting the one or more analog signals to a satellite frequency signal.

39. A method for processing data generated in compliance with a Data Over Cable Service Interface Specification (DOCSIS) standard, for satellite communication, comprising:
(1) receiving DOCSJS-compliant data;
(2) encoding, using a DOCSIS-based integrated circuit, the DOCSIS-compliant data with a forward error correction code;
(3) generating baseband-frequency in-phase and quadrature-phase components of the encoded DOCSIS-compliant data;
(4) interpolating the baseband-frequency in-phase and quadrature-phase components to a common sample rate that is higher than a plurality of DOCSIS-compliant bandwidth sample rates;
(5) digitally pre-compensating the common sample rate baseband-frequency in-phase and quadrature-phase components for impairments encountered in one or more subsequent processes;
(6) converting digitally pre-compensated common sample rate baseband-frequency in-phase and quadrature-phase components to one or more analog signals; and
(7) up-converting the one or more analog signals to a satellite frequency signal.

40. The method according to claim 39, wherein step (2) comprises encoding the DOCSIS-compliant data with a convolutional code.

41. The method according to claim 39, wherein step (2) comprises encoding the DOCSIS-compliant data with a convolutional inner code and a Reed-Solomon outer code.

42. The method according to claim 41, wherein an error correcting ability of the Reed-Solomon outer code is set to zero.

* * * * *

UNITED STATES PATENT AND TRADEMARK OFFICE
CERTIFICATE OF CORRECTION

PATENT NO. : 7,694,210 B2  Page 1 of 1
APPLICATION NO. : 10/208045
DATED : April 6, 2010
INVENTOR(S) : Mark Dale It is certified that error appears in the above-identified patent and that said Letters Patent is hereby corrected as shown below:

At column 13, line 22, please replace "distortion is the" with --distortion in the--.

At column 14, line 48, please replace "DOCSJS" with --DOCSIS--.

Signed and Sealed this

Thirty-first Day of August, 2010

David J. Kappos
*Director of the United States Patent and Trademark Office*